United States Patent Office 3,620,034
Patented Nov. 16, 1971

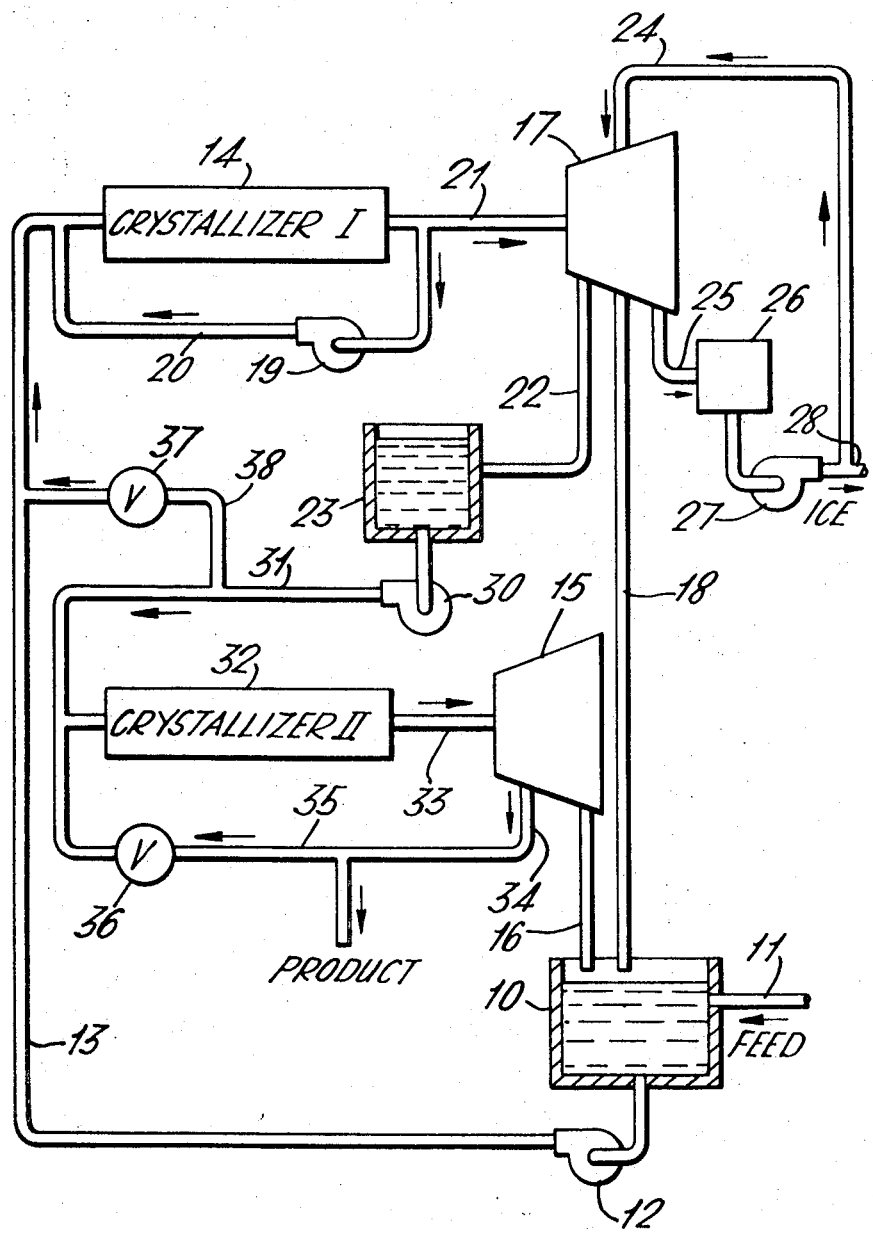

3,620,034
MULTI-STAGE FREEZE CONCENTRATION OF COFFEE
Neophytos Ganiaris, Riverdale, N.Y., assignor to Struthers Patent Corporation, Houston, Tex.
Continuation-in-part of abandoned application Ser. No. 512,365, Dec. 8, 1965, which is a continuation-in-part of application Ser. No. 321,020, Nov. 4, 1963. This application July 11, 1967, Ser. No. 652,532
Claims priority, application Great Britain, July 15, 1966, 31,831/66
The portion of the term of the patent subsequent to Nov. 8, 1983, has been disclaimed
Int. Cl. B01d 9/04; A23f 1/08
U.S. Cl. 62—58
5 Claims

ABSTRACT OF THE DISCLOSURE

In a staged freeze concentration process for concentrating coffee solution, ice crystals are removed from the system after the first stage from less concentrated coffee solution. Ice crystals removed from the more concentrated coffee solution in the second stage are added to incoming feed. Coffee solution from which ice crystals are separated in the second stage is removed from the system as a product.

This application is a continuation-in-part of application Ser. No. 512,365, filed Dec. 8, 1965, and forfeited on June 20, 1969, which is a continuation-in-part of Ser. No. 321,020, filed Nov. 4, 1963 and now Pat. No. 3,283,522 of Nov. 8, 1966.

BACKGROUND OF THE INVENTION

In the freeze concentration of coffee, a coffee solution is passed through a series of crystallizers to provide a slurry of ice crystals in a concentrated coffee solution. The ice crystals are separated from the concentrated coffee solution in a centrifuge and washed. Even when crystals of a uniform and optimum size are produced, considerable valuable coffee solids may be lost with ice crystals from which it is difficult to remove the more concentrated coffee solution.

SUMMARY OF THE INVENTION

This invention provides for the centrifuging of ice crystals from a multi-stage freeze concentration system for coffee which provides coffee solution at a concentration of over 37% from a feed at a concentration of about 26% by centrifuging and removing the ice crystals from the system in a first centrifuge which separates crystals from a coffee solution at a concentration of less than 30% leaving an early or first stage crystallizer. The solution from the first centrifuge is passed through an additional crystallizer and a second centrifuge from which a product stream of a coffee solution of over 37% is withdrawn, ice from the second centrifuge being recycled by being added to the feed.

BRIEF DESCRIPTION OF THE DRAWING

The figure of the drawing is a schematic diagram of a system for the freeze concentration of coffee according to this invention.

Referring to the drawing in detail, a feed solution of 26% by weight coffee dissolved solids enters feed tank 10 through pipe 11. Pump 12 draws this solution from feed tank 10 and passes it through pipe 13 to enter crystallizer 14. The solution passing through pipe 13 from tank 10 will be from 13% to 24% coffee dissolved solids. This lower coffee content results from the fact that the solution is diluted because ice enters tank 10 from centrifuge 15 through pipe 16 and because wash water from centrifuge 17 passes into tank 10 through pipe 18. Thus wash water and the melted ice dilute the feed solution entering crystallizer 14.

A pump 19 may partially recirculate through pipe 20 the slurry of ice crystals and coffee solution leaving crystallizer 14 until the coffee solution contains 26 to 30% coffee dissolved solids. This slurry then passes through pipe 21 to enter centrifuge 17. Mother liquor is separated from the ice crystals in centrifuge 17 and passes through pipe 22 to the mother liquor tank 23. Wash water enters centrifuge 17 through pipe 24 to wash ice crystals therein and flow to tank 10 through pipe 18. Ice passes from centrifuge 17 through pipe 25 to enter the ice tank 26. Some ice melts in tank 26 to be recirculated by pump 27 through pipe 24 as wash water. Ice passes from the system through pipe 28.

The 26 to 30% coffee dissolved solids solution in mother liquor tank 23 is pumped by pump 30 through pipe 31 to the second stage crystallizer 32. A slurry of ice crystals in at least a 37% coffee solution leaves crystallizer 32 through pipe 33 to enter centrifuge 15. The 37% coffee dissolved solids solution leaves centrifuge 15 through pipe 34 as a product. By means of pipe 35 and valve 36, this solution may be recirculated through crystallizer 32.

By means of valve 37 and pipe 38 mother liquor may be recirculated through crystallizer 14. This recirculation is required to raise the concentration of the solution in pipe 13 entering crystallizer 14 above the concentration of the feed while keeping it below 30% coffee dissolved solids. Excessive recirculation through pipe 20 could also serve to concentrate the feed from pipe 13, but this would result in too high a percentage of ice crystals in the crystallizer 32 which would reduce the rate of crystal growth. Recirculation through pipes 20 and 38 should be balanced and controlled so that the percentage of ice crystals by weight in solution in crystallizer 14 is between 20 and 30%. If the percentage of ice crystals is too low, below 15% by weight, as when pipe 20 is not used for recirculation, excessive nucleation and small and non-uniform crystals result which are difficult to centrifuge. When centrifuging ice crystals from the system from a 26 to 30% solution as described, less than 1% coffee solids by weight will be lost with the ice.

While this invention has been shown and described in the best form known, it will nevertheless be understood that this is purely exemplary and that modifications may be made without departing from the spirit and scope of the invention except as it may be more limited in the appended claims wherein:

What is claimed is:

1. A process for the preparation of a concentrate of coffee from a liquid containing about 24% coffee solids which comprises (a) partially freezing aqueous coffee extract in at least two serially connected crystallizer passes to form a mixture of about 20–30% by weight of ice and a concentrated extract, (b) separating said ice by centrifugation from said mixture under conditions whereby a portion of said concentrated extract adheres to said ice, (c) reducing the amount of said concentrated extract adhering to said ice by centrifuging and by washing in the centrifuge with addition of wash water or melted ice (d) melting the ice to form a dilute solution which contains the coffee which had been adhering to the ice and (e) recovering coffee solids from said melted ice.

2. In the freeze concentration of coffee according to claim 1, the steps of:
(a) removing ice from the concentrated coffee solution and mixing the ice with feed solution to melt therein; and (b) removing the concentrated coffee solution from the system as a product.

3. The process according to claim 2 with the additional steps of:
(a) melting to some extent the ice removed from coffee solution to form a wash liquid;
(b) washing ice with the wash liquid; and
(c) recycling the wash liquid after washing ice into the feed.

4. The process according to claim 3 with the additional step of:
recycling at least some of the concentrated coffee solution into the feed.

5. A process as claimed in claim 1 in which coffee solids are recovered from wash water after washing.

References Cited

UNITED STATES PATENTS

| | | | |
|---|---|---|---|
| 1,507,410 | 9/1924 | Zorn | 99—71 |
| 2,408,260 | 9/1946 | Kellogg | 62—58 |
| 2,945,903 | 7/1960 | Findlay | 62—58 |
| 3,102,036 | 8/1963 | Smith | 99—205 |
| 3,156,571 | 11/1964 | Walker | 62—58 |
| 3,205,078 | 9/1965 | Lund | 62—58 |
| 3,216,833 | 11/1965 | McKay et al. | 99—31 |
| 3,285,022 | 11/1966 | Pike | 62—58 |
| 3,362,178 | 1/1968 | Cottle et al. | 99—205 |
| 3,531,295 | 9/1970 | Ganiaris | 62—58 |
| 2,389,732 | 11/1945 | Kellogg | 62—58 X |
| 2,552,523 | 5/1951 | Cunningham | 62—58 |
| 2,851,368 | 9/1958 | Findlay | 99—205 |
| 3,283,522 | 11/1966 | Ganiaris | 62—58 |

OTHER REFERENCES

Sivetz et al.: Coffee Processing Tech., vol. II, 1963, Aui Pub. Co., Westport, Conn., pp. 14–21.

NORMAN YUDKOFF, Primary Examiner

R. T. FOSTER, Assistant Examiner

U.S. Cl. X.R.

99—71, 199, 205